(12) United States Patent
Meris et al.

(10) Patent No.: US 8,776,675 B1
(45) Date of Patent: Jul. 15, 2014

(54) MEAT ROTISSERIE AND ASSOCIATED METHOD

(76) Inventors: Rom Meris, Livermore, CA (US); Teodoro Biala, Jr., Livermore, CA (US)

( * ) Notice: Subject to any disclaimer, the term of this patent is extended or adjusted under 35 U.S.C. 154(b) by 172 days.

(21) Appl. No.: 13/049,872

(22) Filed: Mar. 16, 2011

Related U.S. Application Data

(60) Provisional application No. 61/314,366, filed on Mar. 16, 2010.

(51) Int. Cl.
*A47J 37/04* (2006.01)

(52) U.S. Cl.
USPC .............. 99/419; 99/421 H; 99/474; 99/477; 126/15 A; 126/21 A; 126/312

(58) Field of Classification Search
CPC .......... A47J 43/18; A23N 7/005; A23B 7/148
USPC ............ 99/419, 421 R, 421 H, 476, 477, 474, 99/484; 219/385, 392, 400; 126/15 A, 126/21 A, 25 R, 312
See application file for complete search history.

(56) References Cited

U.S. PATENT DOCUMENTS

| 4,810,856 A * | 3/1989 | Jovanovic ..................... 219/401 |
| 5,121,738 A | 6/1992 | Harris |
| 5,485,780 A * | 1/1996 | Koether et al. ................. 99/419 |
| 5,735,190 A * | 4/1998 | Sham .............................. 99/327 |
| 5,801,362 A * | 9/1998 | Pearlman et al. ............. 219/400 |
| 6,205,996 B1 | 3/2001 | Ryan |
| 6,732,637 B2 | 5/2004 | Artt |
| 8,304,696 B2 * | 11/2012 | Knight .......................... 219/400 |
| 2005/0022676 A1 * | 2/2005 | Swank et al. ................... 99/419 |
| 2005/0098167 A1 | 5/2005 | Sikes |
| 2008/0047949 A1 | 2/2008 | Rustin |
| 2010/0263654 A1 * | 10/2010 | Cusack ....................... 126/25 R |

FOREIGN PATENT DOCUMENTS

WO      WO/90/08449      7/1990

* cited by examiner

Primary Examiner — Dana Ross
Assistant Examiner — James Sims, III

(57) ABSTRACT

A meat cooker effectively cooks meat by using heated convection air to cook inside meat sections and filings, and radiant heat to cook outside meat sections. The meat cooker may include a frame having a cooking zone therein, a heat exchange assembly located within the frame, first and second fans located adjacent to the cooking zone, and a spit disposed at the cooking zone and spaced downstream of the heat exchange assembly. The first fan generates and transmits a first quantity of ambient air along a first travel path inside the heat exchange assembly. The second fan generates and transmits a second quantity of ambient air along a second travel path outside the heat exchange assembly. Notably, the first and second quantities of ambient air are heated to corresponding first and second temperatures upon passing beyond the heat exchange assembly and reaching the spit.

7 Claims, 5 Drawing Sheets

MEAT ROTISSERIE AND ASSOCIATED METHOD

CROSS REFERENCE TO RELATED APPLICATIONS

This application claims the benefit of U.S. Provisional Application No. 61/314,366, filed Mar. 16, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cooking food and, more particularly, to an improved meat griller for providing users with an easy and convenient means of grilling the internal and external parts of an animal by using convection air to cook inside the meat and filings, and conventional radiant heat for the outside meat.

2. Prior Art

Barbecue is a method and apparatus for cooking meat, with the heat and hot smoke of a fire, smoking wood, or hot coals of charcoal, cooking gas, or even electricity; and may include application of a marinade, spice rub, or basting sauce to the meat or vegetables. Barbecue is usually cooked in an outdoor environment heated by the smoke of wood or charcoal. Restaurant barbecue may be cooked in large brick or metal ovens specially designed for that purpose. Barbecue has numerous regional variations in many parts of the world. Notably, in the Southern United States, practitioners consider barbecue to include only indirect methods of cooking over hardwood smoke, with the more direct methods called grilling. In a typical U.S. home grill, food is cooked on a grate directly over hot charcoal. Alternatively, an apparatus called a smoker with a separate fire box may be used. Hot smoke is drawn past the meat by convection for very slow cooking. This is essentially how barbecue is cooked in most U.S. "barbecue" restaurants, but nevertheless, many consider this to be a distinct cooking process called hot smoking.

While they are many automatic grillers in the market, the time to ensure that an animal is thoroughly cooked may be tediously long. This is because, in most conventional grills, the heat is concentrated outside the meat thus causing this side to be cooked first while the inside of the animal remains uncooked. To overcome this problem, most meat is grilled slowly over low heat to ensure that the inside of the animal, fillings and the outside are evenly cooked. This process therefore takes up a lot of users' attention in checking or turning the meat as well as time of grilling.

Accordingly, a need remains for an apparatus in order to overcome the above-noted shortcomings. The present invention satisfies such a need by providing an improved meat griller that is convenient and easy to use, lightweight yet durable in design, versatile in its applications, and designed for grilling the internal and external parts of an animal by using convection air to cook inside the meat and filings, and conventional radiant heat for the outside meat.

BRIEF SUMMARY OF THE INVENTION

In view of the foregoing background, it is therefore an object of the present invention to provide a meat cooker for effectively cooking meat by using heated convection air to cook inside meat sections and filings, and radiant heat to cook outside meat sections. These and other objects, features, and advantages of the invention are provided by a meat cooker preferably including a frame having a cooking zone therein, a heat exchange assembly located within the frame and adjacent to the cooking zone, first and second fans located adjacent to the cooking zone and exterior of the frame, and a spit disposed at the cooking zone and spaced downstream of the heat exchange assembly. The first fan generates and transmits a first quantity of ambient air along a first travel path inside the heat exchange assembly. The second fan generates and transmits a second quantity of ambient air along a second travel path outside the heat exchange assembly. Notably, the first and second quantities of ambient air are heated to corresponding first and second temperatures upon passing beyond the heat exchange assembly and reaching the spit.

In a non-limiting exemplary embodiment, the meat cooker may further include a controller, and a humidity sensor communicatively coupled to the controller. In this manner, the controller toggles the first and second fans at alternate operating levels based upon a detected humidity level received from the humidity sensor such that the first and second temperature levels remain substantially equal.

The present disclosure may further include a method of utilizing a meat cooker for effectively cooking meat by using heated convection air to cook inside meat sections and filings, and radiant heat to cook outside meat sections. Such a method preferably includes the steps of: providing a frame having a cooking zone therein; providing and locating a heat exchange assembly within the frame and adjacent to the cooking zone; providing and locating first and second fans adjacent to the cooking zone and exterior of the frame; providing and disposing a spit at the cooking zone by spacing the spit downstream of the heat exchange assembly; the first fan generating and transmitting a first quantity of ambient air along a first travel path inside the heat exchange assembly; the second fan generating and transmitting a second quantity of ambient air along a second travel path outside the heat exchange assembly; and heating the first and second quantities of ambient air to corresponding first and second temperatures by passing the first and second quantities of ambient air beyond the heat exchange assembly and thereby causing the first and second quantities of ambient air to reach the spit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
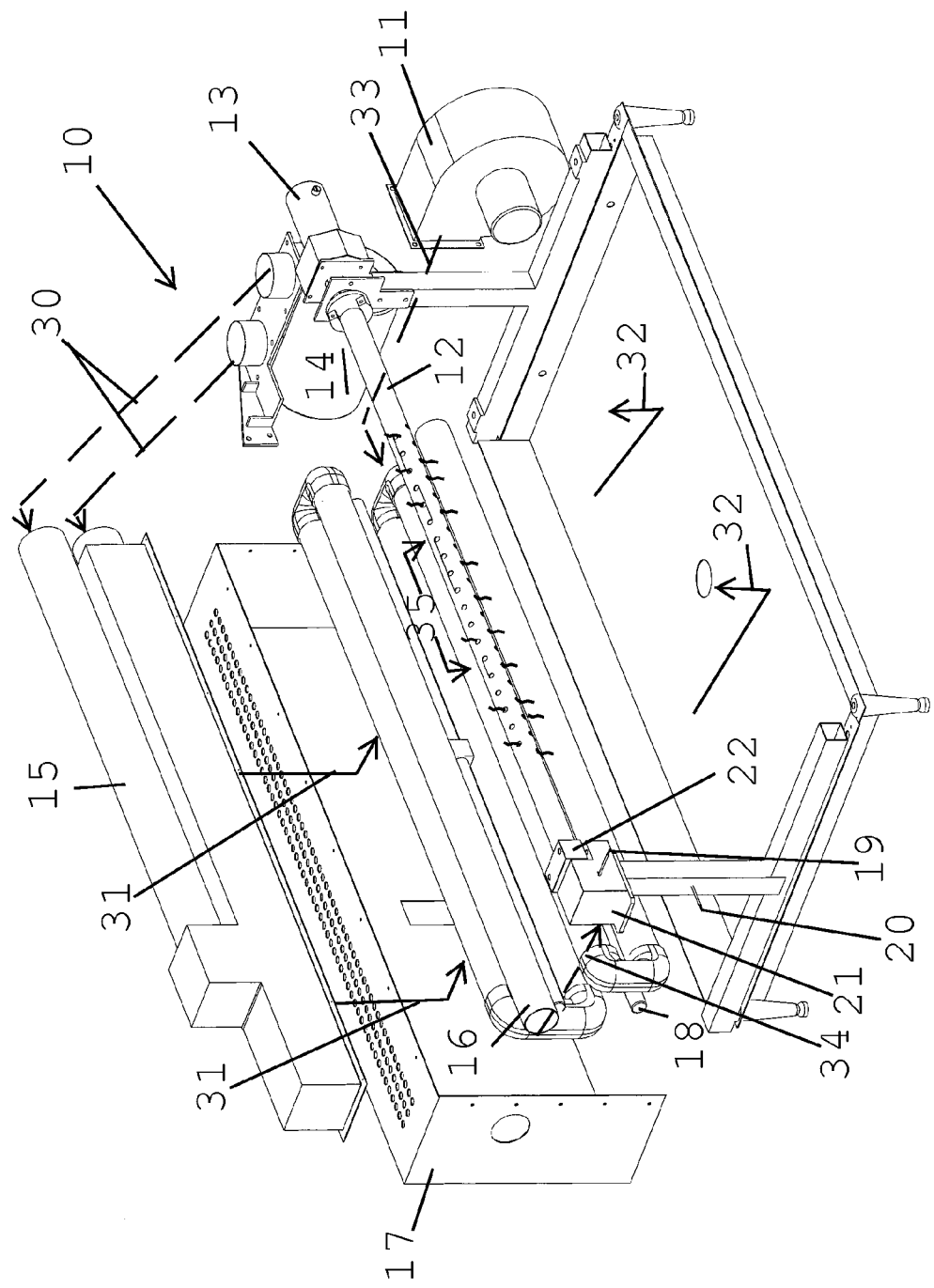
FIG. 1 is a perspective view showing the flow of heating air for both internal and external cooking of a carcass within a cooking zone, in accordance with an embodiment of the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Figure 2:
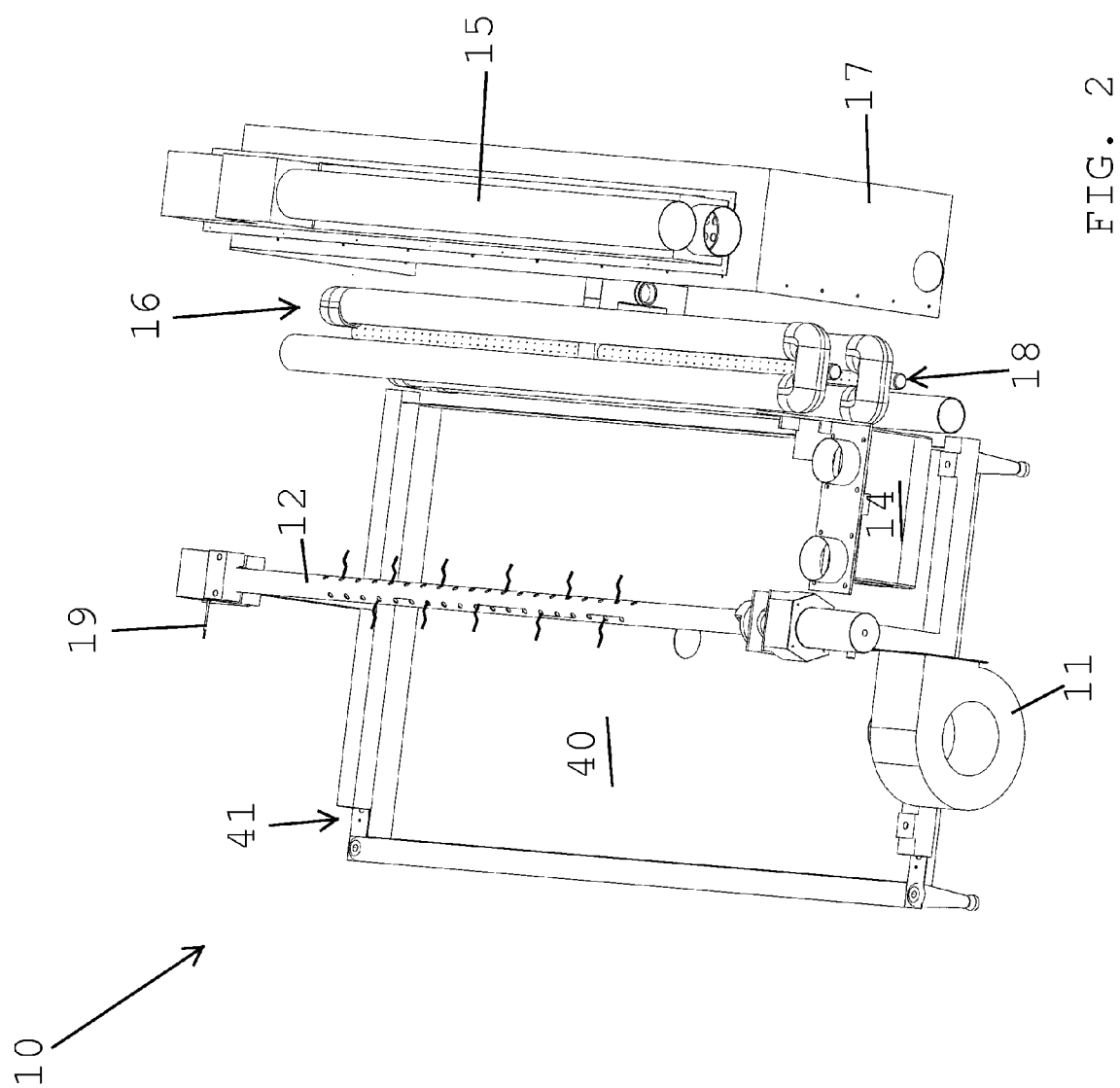
FIG. 2 is a perspective view showing the configuration of the major components of the rotisserie shown in FIG. 1.
Figure 3:
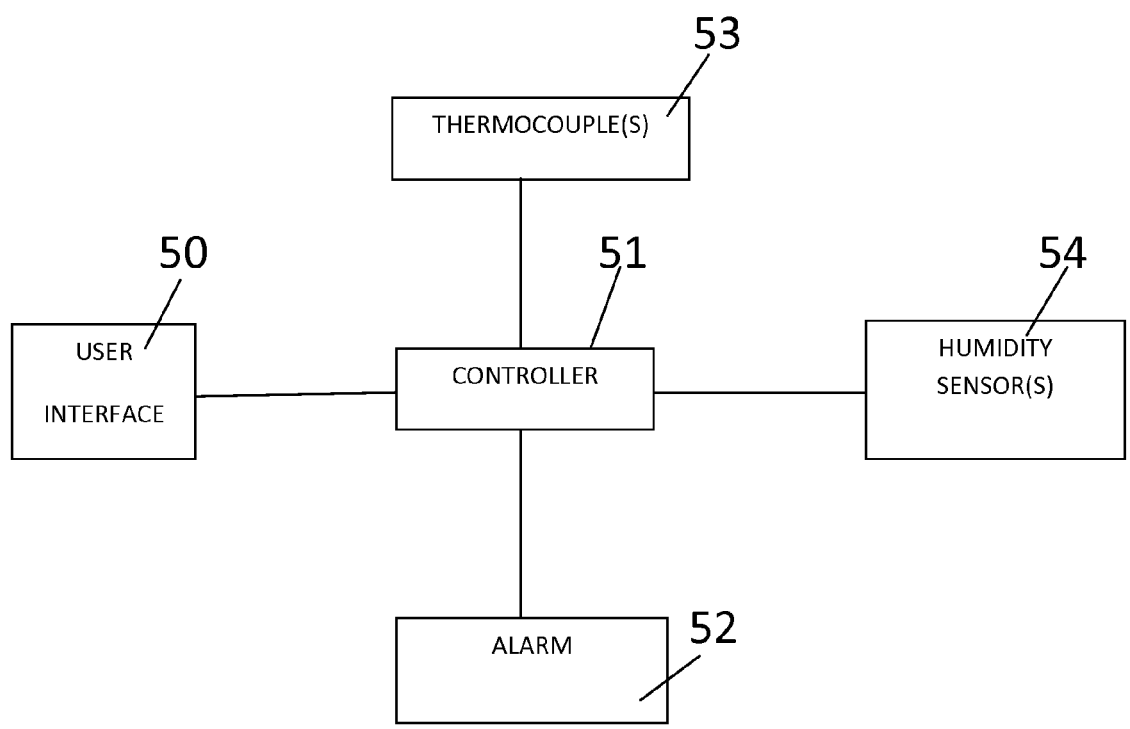
FIG. 3 is a schematic block diagram showing the interrelationship of exemplary electronic components of one embodiment of the rotisserie shown in FIG. 2.
Figure 4:
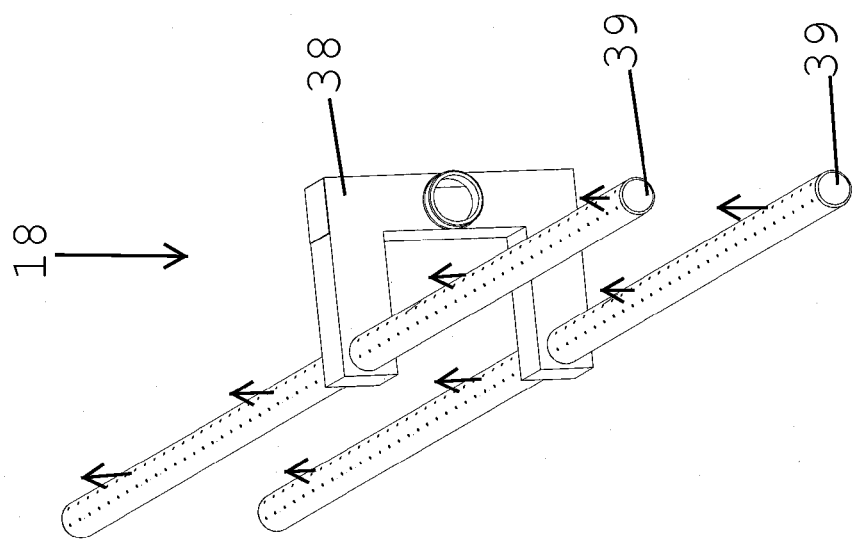
FIG. 4 is perspective view of the burner shown in FIG. 2.
Figure 5:
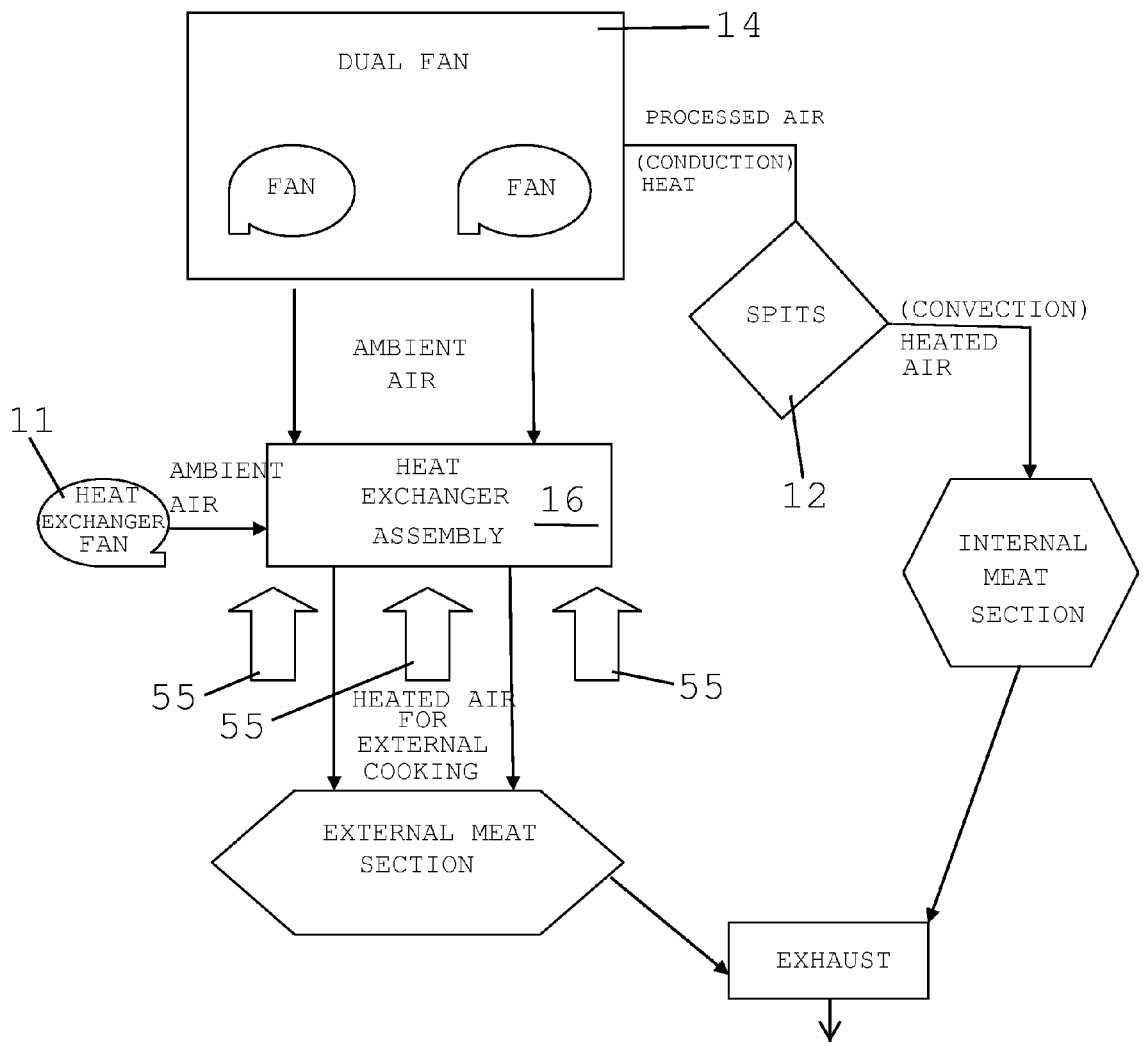
FIG. 5 is a block diagram showing air flow in accordance with an exemplary embodiment of the rotisserie shown in FIG. 2.

The apparatus of this invention is referred to generally in FIGS. 1-5 and is intended to provide a rotisserie 10 for effectively cooking internal and external sections of meat. It should be understood that the present invention may be used to grill the internal and external parts of an animal by using convection air to cook the inside meat and filings, and conventional radiant heat for the outside meat of many different types food, and should not be limited to any particular type of meat. The terms "rotisserie", "apparatus" and "meat cooker" are used interchangeably throughout the disclosure.

In a non-limiting exemplary embodiment, as perhaps best shown in FIGS. 1, 2 and 4-5, a process for cooking an internal section of meat may include the following steps. Ambient air may be sucked by a heat exchanger centrifugal fan 11 and pumped 33 into a pre-heater tube of the heat exchange assembly 16. Air 33 flows inside the tube and retains its moisture. The centrifugal fan 11 may be rated at a fixed CFM (cubic feet per minute) to deliver the right amount of air 33 for internal cooking. It is also rated to deliver the precise efficiency of the heat exchange system for cooking purposes. The centrifugal fan 11 may be equipped with a filtering device for clean air processing.

The ambient air temperature is raised to a first desired temperature after passing a pre-heater tube of the heat exchange assembly 16. The processed air flow continues to the first pass tube of heat exchange assembly 16 where it is heated to a second desired temperature. The processed air flow continues to the second pass tube where it is heated to a third temperature. The processed air flow continues to a third pass tube where it is heated to a fourth desired temperature. The processed air flow continues to a final pass of the heat exchange assembly 16 and reaches a final desired temperature for cooking an internal section of the meat.

The heat exchange assembly 16 may be a 4-pass system where ambient air temperature 33 is raised to the desired cooking temperature. In this manner, advantageously, the ambient air 33 retains it humidity content where it is either converted to steam or saturated moisture. The heat exchange assembly 16 may be heated by infra red waves 55, either by flame that can be powered by natural gas, propane or LPG. Using electricity is also an option. The processed air for internal cooking does not come in contact with the flame (air remains inside the tube during all four passes while flames remain outside the tube), and therefore not exposed to combustion. Such a structural configuration provides the advantage of maintaining moisture and/or humidity in the processed air during convection cooking of the internal meat portions.

The designed efficiency of the heat exchange assembly 16 automatically controls the cooking temperature of convection air for internal cooking. The temperature of convection air, for inside cooking, may be directly proportional to the temperature of an oven (for external cooking of meat). The clean processed air 34 is further propelled to the hollow spit 12 where the meat is skewed. Perforations in the spit 12 release an amount of heated moist air for internal cooking of the meat. Convection air that flows in the hollow spit 12 and out of the perforations transfer heat to the spit 12.

By conduction, the temperature of convection air for internal cooking equals the temperature of the spit 12. Cooking by conduction is also achieved very efficiently. Internal cooking therefore is achieved by convection air (as processed in the heat exchanger assembly 16) and conduction (heated spit 12). The exiting convection air from the spit 12 and meat openings are now released to the oven. The radiant heat from the oven picks up the moisture and delivers it out of the exhaust system.

Referring to FIGS. 1-5, a non-limiting exemplary embodiment of the external cooking process may include infra red waves 55 that heat outside walls and parts of the heat exchange assembly 16. A burner assembly 18 provides the supply of infra red waves 55. The burner assembly 18 may include a U-shaped bracket 38 having an inlet port for receiving the flames from a power source. A pair of close-ended tubes 39 each has plurality of apertures that release the flames outwardly therefrom to heat the ambient air 33 passing through the tubes of heat exchange assembly 16. The amount of infra red waves 55 delivered to the heat exchange assembly 16 may be controlled by a controller 51 having programmable logic control (PLC) where combustible gases are supplied based on feedback from thermocouples 19, 20, 53.

A dual exhaust centrifugal fan 14 propels the radiant heat to the oven by initially passing through air duct 15, down through shroud 17, across heat exchange assembly 16 and up towards spit 12. The air 30 that cools down the outside parts of the heat exchange assembly 16 is converted to convection air 31, 32. This convection air 31, 32 is in contact with the flames and used as a medium for cooking the outside part of the meat. The temperature of this air 32, may be called the oven temperature.

The convection air 35 that enters the carcass of the animal cooks the fillings and inside meat/bones at the same time. A good example is when grilling turkey with fillings in it. There were multiple reported instances that if the fillings and inside meat are not properly heated, salmonella and *E. coli* will thrive in the meat. With an exemplary embodiment presented herein, as the fillings tumble inside the meat carcass during rotation of a turret, everything is cooked at the same temperature as the outside meat. Aside from the benefit of sanitation, another benefit is the flavor of the fillings that penetrates deeply into the meat.

In a non-limiting exemplary embodiment, ambient air 33 is forced into the heat exchanger tubes (heat exchange assembly 16) by the use of the heat exchanger centrifugal fan 11. The ambient air 33 is heated as it flows inside the heat exchange assembly 16 and is termed as convection air. The size (length and diameter) of heat exchange tubes are critical to the cubic foot per minute volume (CFM) and temperature of the convection air. One end of the heat exchange tubes is connected to the centrifugal fan 11 while the other end is connected to the hollow turret where the meat is pinned. Radiant heat cooks the outside meat. The temperature of radiant heat may substantially equal a temperature of convection air for cooking internal sections of the meat. Thus, the temperature is automated by the controller 51 to maintain such a consistency. For example, once set at 450 degrees Fahrenheit at the controller 51, the radiant and convection air will stay at 450 degrees Fahrenheit, respectively.

One skilled in the art understands that it is easy to automate an electric oven at a desired temperature, but not with gas or charcoal fired ovens. Embodiments of the present disclosure may employ natural gas, propane or charcoal fire and advantageously automatically control temperature both radiant and convention temperatures for external and internal cooking, respectively. Such automation overcomes prior art shortcomings of under and/or over cooking meat.

In a non-limiting exemplary embodiment, an infra red light sensor (not shown) may tell the operator the temperature of the meat. No need to stop the turret and check manually. For example, a humidity sensor 54 senses the relative humidity (RH) of the exhausting air at the back of the rotisserie (product of convection and radiant heat). Once the RH reaches a desired low point, gas is automatically shut off, signaling the end of the cooking process. For example, if the operator desires to retain moisture in the cooked meat, the RH may be set to 5% at the controller 51. Cooking will be terminated automatically when RH reaches 5%.

Because two sources of heat (radiant and convection) are cooking both sections of the meat, cooking time may be reduced by up to 80% compared to normal grilling; cooks whole animal such as cow, pig, lamb, turkey and chicken. There is easy set-up and tear down because of unique mechanical design of removal parts; mechanical design of union that connects stationary end of heat exchanger tube to the rotating turret.

The automated temperature control function may be equipped with at least one thermocouple 19, 20 and a digital controller 51 to accurately control the temperatures of the radiated 32 and convection air 35 within the housing via a user interface 50. A humidity sensor 54 may be installed at a suitable exhaust port and communicatively linked to an alarm 52 to notify the user when the meat is cooked. The apparatus 10 may include snap-on mechanical devices 21 22, such as conventional locking mechanisms of the turret mechanism for easy set-up and clean-up. The speed of the turret mechanism may further be of variable via conventional motor driven axle 13 whereby an operator may speed up, slow down and/or stop the turret mechanism for even 'browning' of the skin at the end of the cooking process. The turret mechanism is collectively referred to as the spit 12, and mechanical devices 21, 22. Drip pan 40 collects drippings from the carcass and may be supported by frame 41 above ground. A shroud 17 is also provided for shielding the heat exchange assembly 16.

Referring to FIGS. 1-5, in a non-limiting exemplary embodiment, the meat cooker 10 preferably includes a frame 41 having a cooking zone therein, a heat exchange assembly 16 located within the frame 41 and adjacent to the cooking zone, first 11 and second 14 fans located adjacent to the cooking zone and exterior of the frame 41, and a spit 12 disposed at the cooking zone and spaced downstream of the heat exchange assembly 16. The first fan 11 generates and transmits a first quantity of ambient air along a first travel path 33, 34 inside the heat exchange assembly 16. The second fan 14 generates and transmits a second quantity of ambient air along a second travel path 30-32 outside the heat exchange assembly 16. Notably, the first and second quantities of ambient air are heated to corresponding first and second temperatures upon passing beyond the heat exchange assembly 16 and reaching the spit 12. Such a structural configuration advantageously cooks both internal and external sections of meat on spit 12.

In a non-limiting exemplary embodiment, the meat cooker 10 may further include a controller 51, and a humidity sensor 54 communicatively coupled to the controller 51. In this manner, the controller 51 toggles the first and second fans 11, 14 at alternate operating levels based upon a detected humidity level received from the humidity sensor 54 such that the first and second temperature levels remain substantially equal. Otherwise, an alarm signal is emitted from alarm 52.

The present disclosure may further include a method of utilizing a meat cooker 10 for effectively cooking meat by using heated convection air to cook inside meat sections and filings, and radiant heat to cook outside meat sections. Such a method preferably includes the steps of: providing a frame 51 having a cooking zone therein; providing and locating a heat exchange assembly 16 within the frame 41 and adjacent to the cooking zone; providing and locating first and second fans 11, 14 adjacent to the cooking zone and exterior of the frame 41; providing and disposing a spit 12 at the cooking zone by spacing the spit 12 downstream of the heat exchange assembly 16; the first fan 11 generating and transmitting a first quantity of ambient air along a first travel path 33, 34 inside the heat exchange assembly 16; the second fan 14 generating and transmitting a second quantity of ambient air along a second travel path 30-32 outside the heat exchange assembly 16; and heating the first and second quantities of ambient air to corresponding first and second temperatures by passing the first and second quantities of ambient air beyond the heat exchange assembly 16 and thereby causing the first and second quantities of ambient air to reach the spit 12.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A meat cooker for effectively cooking meat by using heated convection air to cook inside meat sections and filings, and radiant heat cook outside meat sections, said meat cooker comprising:
   a frame having a cooking zone therein;
   a heat exchange assembly located proximate to said cooking zone;
   first and second fans located adjacent to said cooking zone; and
   a spit disposed at said cooking zone and spaced downstream of said heat exchange assembly;
   wherein said first fan generates and transmits a first quantity of ambient air along a first travel path inside said heat exchange assembly;
   wherein said second fan generates and transmits a second quantity of ambient air along a second travel path outside said heat exchange assembly;
   wherein said first and second quantities of ambient air are heated to corresponding first and second temperatures upon passing beyond said heat exchange assembly and reaching said spit;
   wherein said heat exchange assembly includes a plurality of tubes;
   wherein said spit includes an outer surface having a plurality of perforations spaced along a longitudinal length thereof;
   wherein said first travel path passes through an interior of said tubes and said spit, and thereafter exits from said perforations of said spit;
   wherein said second travel path traverses an exterior of said tubes and said spit.

2. The meat cooker of claim 1, wherein said plurality of tubes comprise:
   an elongated first tube connected to said first fan;
   an elongated second tube connected to said first tube and traveling substantially parallel thereto;
   an elongated third tube coupled to said second tube and traveling substantially parallel thereto; and
   an elongated fourth tube coupled to said third tube and traveling substantially parallel thereto;
   wherein said fourth tube is connected to said spit;
   wherein said first travel path extends within an interior of said first tube, said second tube, said third tube, said fourth tube and said spit.

3. The meat cooker of claim 2, wherein said heat exchange assembly further comprises:
   at least one close-ended tube having a plurality of apertures spaced along an outer surface thereof; and
   a power source in communication with said at least one close-ended tube, said power source for generating and transmitting flames into said at least one close-ended tube in such a manner that said flames exit from said apertures adjacent to an exterior of said first tube, said second tube, said third tube and said fourth tube.

4. The meat cooker of claim 3, wherein said first tube, said second tube, said third tube and said fourth tube are disposed proximate to said close-ended tube and thereby heating the first quantity of ambient air passing along said first travel path.

5. The meat cooker of claim 1, further comprising:
   a controller; and
   a humidity sensor communicatively coupled to said controller;
   wherein said controller toggles said first and second fans at alternate operating levels based upon a detected humidity level received from said humidity sensor such that said first and second temperature levels remain substantially equal.

6. A meat cooker for effectively cooking meat by using heated convection air to cook inside meat sections and filings, and radiant heat cook outside meat sections, said meat cooker comprising:
   a frame having a cooking zone therein;
   a heat exchange assembly located within said frame and adjacent to said cooking zone;
   first and second fans located at least partially exterior of said cooking zone; and
   a spit disposed at said cooking zone and spaced downstream of said heat exchange assembly;
   wherein said first fan is exposed to an ambient atmosphere exterior of said cooking zone such that said first fan generates and transmits a first quantity of ambient air along a first travel path inside said heat exchange assembly;

wherein said second fan is exposed to the ambient atmosphere exterior of said cooking zone such that said second fan generates and transmits a second quantity of ambient air along a second travel path outside said heat exchange assembly;

wherein said first and second quantities of ambient air are heated to corresponding first and second temperatures upon passing beyond said heat exchange assembly and reaching said spit;

wherein said first travel path passes inside a portion of said heat exchange assembly and said spit;

wherein said first travel path is isolated from said second travel path until said first travel path exits from an interior of said spit;

wherein said second travel path is located exterior of said heat exchange assembly and said interior of said spit.

7. The meat cooker of claim 6, further comprising:

a controller; and a humidity sensor communicatively coupled to said controller;

wherein said controller toggles said first and second fans at alternate operating levels based upon a detected humidity level received from said humidity sensor such that said first and second temperature levels remain substantially equal.

* * * * *